(12) United States Patent
Thibadeau

(10) Patent No.: US 7,539,890 B2
(45) Date of Patent: May 26, 2009

(54) HYBRID COMPUTER SECURITY CLOCK

(75) Inventor: Robert H. Thibadeau, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 569 days.

(21) Appl. No.: 11/410,447

(22) Filed: Apr. 25, 2006

(65) Prior Publication Data

US 2007/0250734 A1    Oct. 25, 2007

(51) Int. Cl.
    G04F 8/00      (2006.01)
    G04F 10/00     (2006.01)
    G06F 1/00      (2006.01)

(52) U.S. Cl. .................. 713/502; 368/9; 368/107; 368/111; 368/184; 368/187; 713/178; 713/500; 725/2

(58) Field of Classification Search .................. 713/500, 713/502; 726/2; 368/9, 107, 111, 184, 187
See application file for complete search history.

(56) References Cited

U.S. PATENT DOCUMENTS

| | | | |
|---|---|---|---|
| 3,576,544 A | 4/1971 | Cordero, Jr. et al. | 340/172.5 |
| 3,890,601 A | 6/1975 | Pietrolewicz | 340/172.5 |
| 4,183,085 A | 1/1980 | Roberts et al. | 364/200 |
| 4,442,484 A | 4/1984 | Childs, Jr. et al. | 364/200 |
| 5,012,514 A | 4/1991 | Renton | 380/4 |
| 5,022,077 A | 6/1991 | Bealkowski et al. | 380/4 |
| 5,027,401 A | 6/1991 | Soltesz | 380/54 |
| 5,101,374 A | 3/1992 | Sinutko, Jr. | 395/725 |
| 5,345,590 A | 9/1994 | Ault et al. | 395/650 |
| 5,394,469 A | 2/1995 | Nagel et al. | 380/4 |
| 5,432,939 A | 7/1995 | Blackledge, Jr. et al. | 395/700 |
| 5,448,045 A | 9/1995 | Clark | 235/382 |
| 5,504,814 A | 4/1996 | Miyahara | 713/200 |
| 5,600,805 A | 2/1997 | Fredericks et al. | 395/825 |
| 5,623,637 A | 4/1997 | Jones et al. | 395/491 |
| 5,754,821 A | 5/1998 | Cripe et al. | 395/491 |
| 5,809,546 A | 9/1998 | Greenstein et al. | 711/164 |
| 5,892,899 A | 4/1999 | Aucsmith et al. | 395/186 |
| 5,892,902 A | 4/1999 | Clark | 395/187.01 |
| 5,928,364 A | 7/1999 | Yamamoto | 713/202 |
| 5,940,513 A | 8/1999 | Aucsmith et al. | 380/25 |
| 5,949,601 A | 9/1999 | Braithwaite et al. | 360/60 |

(Continued)

FOREIGN PATENT DOCUMENTS

| | | |
|---|---|---|
| EP | 0 965 903 A1 | 12/1999 |
| JP | 5134863 A2 | 6/1993 |
| JP | 8115266 A2 | 5/1996 |
| WO | WO 99/59049 | 11/1999 |

OTHER PUBLICATIONS

TC Specification Architecture Overview, Specification Revision 1.2, Apr. 2004.

(Continued)

*Primary Examiner*—Mark Connolly
(74) *Attorney, Agent, or Firm*—Westman, Champlin & Kelly, P.A.; David D. Brush

(57) ABSTRACT

A clock object is provides, which includes a clock time and a monotonic time that are readable by the electronic device. The monotonic time is incremented every read of the monotonic time from the clock object. The clock object can also include an indication of a level of trust of the clock time.

19 Claims, 2 Drawing Sheets

U.S. PATENT DOCUMENTS

| | | | |
|---|---|---|---|
| 6,000,023 A | 12/1999 | Jeon | 711/173 |
| 6,044,349 A | 3/2000 | Tolopka et al. | 705/1 |
| 6,092,202 A | 7/2000 | Veil et al. | 713/201 |
| 6,134,662 A | 10/2000 | Levy et al. | 713/200 |
| 6,138,239 A | 10/2000 | Veil | 713/200 |
| 6,141,752 A | 10/2000 | Dancs et al. | 713/172 |
| 6,157,984 A | 12/2000 | Fisher et al. | 711/112 |
| 6,173,402 B1 | 1/2001 | Chapman | 713/182 |
| 6,175,924 B1 | 1/2001 | Arnold | 713/189 |
| 6,182,222 B1 | 1/2001 | Oparaji | 713/206 |
| 6,192,472 B1 | 2/2001 | Garay et al. | 713/165 |
| 6,219,726 B1 | 4/2001 | Ripberger | 710/36 |
| 6,219,771 B1 | 4/2001 | Kikuchi et al. | 711/164 |
| 6,253,281 B1 | 6/2001 | Hall | 711/112 |
| 6,268,789 B1 | 7/2001 | Diamant et al. | 340/5.74 |
| 6,269,409 B1 | 7/2001 | Solomon | 709/329 |
| 6,321,358 B1 | 11/2001 | Anderson | 714/763 |
| 6,324,627 B1 | 11/2001 | Kricheff et al. | 711/163 |
| 6,330,653 B1 | 12/2001 | Murray et al. | 711/173 |
| 6,336,187 B1 | 1/2002 | Kern et al. | 713/161 |
| 6,360,945 B1 | 3/2002 | Drew | 235/382 |
| 6,446,209 B2 | 9/2002 | Kern et al. | 713/193 |
| 6,647,481 B1 | 11/2003 | Luu et al. | 711/206 |
| 6,650,492 B2 | 11/2003 | Lenny et al. | 360/31 |
| 6,691,198 B1 | 2/2004 | Hamlin | 710/305 |
| 6,691,226 B1 | 2/2004 | Frank, Jr. et al. | 713/100 |
| 6,711,605 B2 | 3/2004 | Sekiguchi et al. | 709/1 |
| 6,820,063 B1* | 11/2004 | England et al. | 705/54 |
| 6,836,853 B1* | 12/2004 | Dover et al. | 713/502 |
| 6,854,039 B1 | 2/2005 | Strongm et al. | 711/163 |
| 6,892,383 B1 | 5/2005 | Arndt | 718/1 |
| 6,957,364 B2 | 10/2005 | Shimooka et al. | 714/25 |
| 7,228,243 B2* | 6/2007 | Brenner | 702/61 |
| 2002/0077177 A1 | 6/2002 | Elliott | 463/40 |
| 2002/0136406 A1 | 9/2002 | Fitzhardinge et al. | 380/210 |
| 2002/0157010 A1 | 10/2002 | Dayan et al. | 713/191 |
| 2002/0178337 A1 | 11/2002 | Wilson et al. | 711/173 |
| 2003/0023867 A1 | 1/2003 | Thibadeau | 713/200 |
| 2003/0225960 A1 | 12/2003 | Guu et al. | 711/103 |
| 2004/0073795 A1 | 4/2004 | Jablon | 713/171 |
| 2004/0088513 A1 | 5/2004 | Biessener et al. | 711/173 |
| 2004/0128500 A1* | 7/2004 | Cihula et al. | 713/155 |
| 2005/0066191 A1 | 3/2005 | Thibadeau | 713/200 |
| 2005/0160151 A1 | 7/2005 | Rawson, III | 709/213 |
| 2005/0177714 A1 | 8/2005 | Jeong et al. | 713/155 |
| 2005/0210266 A1 | 9/2005 | Cottrell et al. | 713/185 |
| 2008/0215306 A1* | 9/2008 | Lidji et al. | 703/26 |

OTHER PUBLICATIONS

"Initializing the CryptoMemory® Device for Smart Card Applications, Atmel Crypto Memory® Application Note," Atmel Corporation, 2003, pp. 1-12.

"TCPA PC Specific Implementation Specification," Version 1.00, Booklet, Sep. 9, 2001. pp. 1-70.

Gobioff, H. et al.; "Security for Network Attached Storage Devices," School of Computer Science, Carnegie Mellon University, Oct. 23, 1997. pp. 1-18.

"Trusted Computing Platform Alliance (TCPA)", Main Specification Version 1.1a, Booklet, Nov. 12, 2001, pp. 1-321.

"Intel® Protected Access Architecture," Application Interface Specification Revision 1.0, Booklet, Mar. 2001. pp. 1-128.

Strunk, J.D. et al.; "Self-Security Storage: Protecting Data in Compromised Systems," 4th Symposium on Operating Sytems Design and Implementation, Oct. 2000, pp. 1-15.

Tao et al., W.; "Research on a Dedicated CPU Architecture for Java IC Card," ACTA Electronica Sinica, vol. 28, No. 11, Nov. 2000, pp. 77-80, 76. Chinese Inst. Electron, China.

"Public Protection of Software," ACM Transactions on Computer Systems, vol. 5, No. 4, Nov. 1987, pp. 371-393.

Saltzer, Jerome H., "Protection and Control of Information Sharing in Multics," Communications of the ACM, vol. 17, No. 7, Jul. 1974.

Wilkes, M.V.; "Hardware Support for Memory Protection: Capability Implementation,", Digital Equipment Corporation, ACM 1982, pp. 108-116.

Brenner, R.; "Smart Cards with Built-In Microprocessors: Partition into Virtual Cards," Elektronik, vol. 43, No. 9, May 3, 1994, pp. 38-44, Germany.

"SECUR'ACCes: access control with the CP8 smart card", SECURICOM 87, 5th Worldwide Congress on Computer and Communications Security and Protection.SEDEP. 1987, pp. 187-196, Paris, France.

"Memory Protection Software Facility for OS/2 Shared Data Applica-tions", IBM Technical Disclosure Bulletin, pp. 81-89, Sep. 1991.

"Modular System Partition," IBM Technical Disclosure Bulletin, pp. 341-342, Dec. 1992.

"Preventing Access to a Personal Computer," IBM Technical Disclosure Bulletin, pp. 98-100, Sep. 1992.

"Password Protection of Separate Hard Disk Partitions," IMB Technical Disclosure Bulletin, pp. 103-104, Nov. 1996.

* cited by examiner

HYBRID COMPUTER SECURITY CLOCK

CROSS-REFERENCE TO RELATED APPLICATIONS

Cross-reference is hereby made to U.S. application Ser. No. 11/410,702, entitled "VERSATILE ACCESS CONTROL SYSTEM" and U.S. application Ser. No. 11/410,453, entitled "VERSATILE SECURE AND NON-SECURE MESSAGING, which were filed on even date herewith and are hereby incorporated by reference.

Cross-reference is also made to copending U.S. patent application Ser. Nos. 09/912,931, filed Jul. 25, 2001 and entitled "METHODS AND SYSTEMS FOR PROMOTING SECURITY IN A COMPUTER SYSTEM EMPLOYING ATTACHED STORAGE DEVICES"; 10/963,373, filed Oct. 12, 2004 and entitled "SYSTEM AND METHOD FOR DELIVERING VERSATILE SECURITY, DIGITAL RIGHTS MANAGEMENT, AND PRIVACY SERVICES FROM STORAGE CONTROLLERS"; 10/984,368, filed Nov. 9, 2004 and entitled "SYSTEM AND METHOD FOR DELIVERING VERSATILE SECURITY, DIGITAL RIGHTS MANAGEMENT, AND PRIVACY SERVICES"; 11/178,908, filed Jul. 11, 2005 and entitled "METHODS AND SYSTEMS FOR PROMOTING SECURITY IN A COMPUTER SYSTEM EMPLOYING ATTACHED STORAGE DEVICES"; 11/343,338, filed Jan. 31, 2006 and entitled "METHOD AND APPARATUS FOR PROVIDING VERSATILE SERVICES ON STORAGE DEVICES"; and 11/346,118, filed Feb. 2, 2006 and entitled "METHODS AND SYSTEMS FOR PROMOTING SECURITY IN A COMPUTER SYSTEM EMPLOYING ATTACHED STORAGE DEVICES".

FIELD OF THE DISCLOSURE

The present disclosure relates generally to electronic computing devices, and more particularly but not by limitation to clock architectures for providing information about time, such as for security functions.

BACKGROUND OF THE DISCLOSURE

Electronic devices often include a clock for providing information about time. For example, it is desirable for electronic devices that perform security functions to have a means for obtaining date and time information. For forensic logging functions, it is important to have the capability of logging the times of certain events.

A real time clock keeps track of the current time even when the device is turned off. A real time clock therefore requires a source of power, such as a battery, that allows the clock to continue to function and keep time after the device is powered down. In contrast, clocks that are not real time do not function when the device is turned off but keep time fairly accurately when powered-up.

A problem common to many electronic devices, such as storage devices, is that it is often impractical to include a real time clock for cost reasons or reasons of practicality around the need for power. This makes it difficult to maintain accurate time information and to log a precise order of events so that evidence as to what even occurred and when the event occurred cannot be easily repudiated.

A clock architecture is therefore desired that is capable of providing electronic devices with at least some clock information that can be used to reliably order events without the need for constant power, depending on the context of the device and the context of use.

One or more embodiments of the present invention provide solutions to these and other problems, and offer other advantages over the prior art.

SUMMARY

An embodiment of the present invention is directed to a clock object. The clock object includes a clock time and a monotonic time that are readable by the electronic device. The monotonic time is incremented for every read of the monotonic time from the clock object.

Another embodiment of the present invention is directed to a clock object, which includes a clock time that is readable by an electronic device and a trust indicator indicative of a trust level of the clock time. The clock object is adapted to return the clock time and the trust indicator to the electronic device in response to a clock read request from the electronic device.

For example, the clock time can include at least one of a high trust clock time and a low trust clock time. The trust indicator and at least one of the high trust clock time and the low trust clock time is returned to the electronic device in response to the read request.

In a further embodiment, the clock object comprises a static set time representative of a source time read from a clock source, wherein the clock time is based on the source time. The clock object further comprises a lag time representative of a delay in successfully recording the set time in the clock database.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
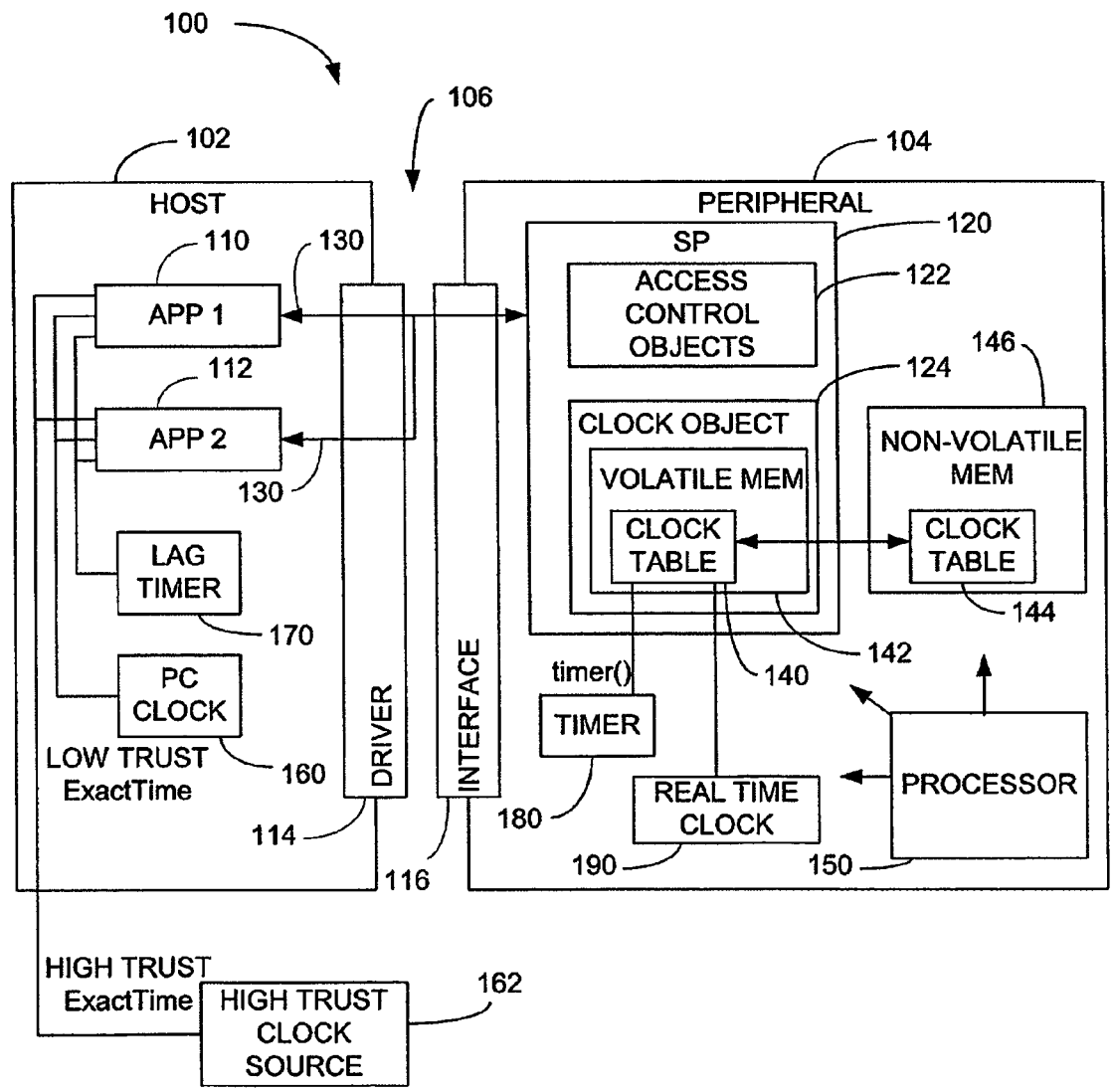
FIG. 1 is a block diagram of a multicomponent platform having a peripheral device with a firmware-embedded clock object according to an embodiment of the present invention.

One or more embodiments of the present disclosure are directed to a hybrid clock architecture in the form of a clock object, which provides "clock time" that are based on different clock sources, depending on the context of the device and the context of use, along with information on clock error and clock reliability. The clock object also provides a monotonic time, which is always capable of ordering events regardless of the granularity of the clock time. The terms "time" or "clock time" can include any time information in any format or time unit, such as a date, a time of day, and/or a count.

When a request is made to the clock object for information on clock time, the clock object returns the current clock time with an indication of the kind of clock from which the clock information is provided. An embodiment of the clock object has the following basic properties:

a. It can record and report both true clock (date/time) and a monotonically incrementing counter (the monotonic time) as appropriate to the circumstances;

b. It distinguishes more reliable clock times that are externally set from less reliable clock times that are externally set;

c. It provides a means for bounding the error around externally set clock times;

d. It provides a natural means for using a reliable internal real time clock if that is available.

1. Introduction

For purposes of description, the following disclosure provides an example of a hybrid clock object associated with a "peripheral" that is coupled to a "host" by a communication channel, where the host sets and fetches the current clock time over the communication channel. The terms host and peripheral only distinguish that the host solicits a communication session with the peripheral. The host device and the peripheral device each can include any electronic computing device or peripheral of a computing device, such as but not limited to, desktop computer systems, laptop computer systems, networked computer systems, wireless systems such as cellular phones and PDA's, digital cameras including self-contained web-cams, storage devices, and/or any reasonable combination of these or other systems and devices.

The clock object can also be implemented in other environments and on any electronic device, such as directly on a host in a messaging or non-messaging environment. The clock object can be accessed over a communications channel, a data bus, or through other direct or indirect connections or databases.

In an example embodiment, the clock object maintains a table or other database with a time record and other time-related information. The peripheral device may include any number of clock objects, but typically one object would be designated as a default clock object.

The clock object keeps track of date-time utilizing two time markers, for example:

a 64 bit SNTP Clock Time field (IETF RFC 2030) called ExactTime; and a 64 bit SNTP Clock Time error field called LagTime, where SNTP refers to "Simple Network Time Protocol". Other time formats, protocols or standards can also be used.

The clock object receives the ExactTime from the host, so it is expected that the host or some process communicating through the host will measure the time lag between when it reads the clock time from its source of clock time, to the time when it receives confirmation from the clock object that the ExactTime has been received. The host process then sends the LagTime to the clock object and, on receipt of the LagTime the clock object permanently records the ExactTime and the LagTime. In this way, the clock object knows a number for the ExactTime and can also bracket the error, if only roughly, through the LagTime. It should be clear the host can optionally repeat this operation to provide an average lag time or a maximum bounding lag time as suited to the particular circumstances.

The clock object is also capable of distinguishing between time received from a HighTrust Source and time received from a LowTrust Source. A HighTrust Source may be a remote, but strongly protected source of the time, while a LowTrust Source may be an immediate, but not strongly protected source of time, such as the local personal computer (PC) clock.

In one embodiment of the present invention, the clock object assumes that the HighTrust source is able to provide a more authoritative time, but with a larger LagTime, so the clock object uses the HighTrust source to bracket the error in the LowTrust ExactTime. In this way, a LowTrust, but accurate time, can be detected and used. In many cases, a LowTrust source provides a more precise, reliable time with greater grannularity than a HighTrust source. But, the HighTrust source is often more authoritative, or trusted, on the current relative time.

As described in more detail below, the clock object can be set to accept both a LowTrust ExactTime and a HighTrust ExactTime, just a LowTrust ExactTime without a HighTrust bracket, or just a HighTrust ExactTime using clock object modes called HighTrustMode and LowTrustMode.

The clock object can also have two additional time modes, TimerMode and ClockMode, to distinguish when the time has been set after a device reset or if the clock object has never been given a setting time. After a reset, the clock object is placed in TimerMode (unless the device includes a backup battery that maintains time progression and time information when the device is reset or powered down). In TimerMode, the ExactTime is still incremented in time, but a read will show that the fetched time value cannot be trusted as an absolute because of the reset.

In addition to the LowTrust ExactTime and the HighTrust ExactTime, the clock object also, independently, maintains a monotonic counter, which increments its value each time that a clock time is read from the clock object. In one embodiment, the counter includes a 64 bit persistent counter having a value called MonoticTime. The MonotonicTime is "monotonic" in that it maintains a progressively incrementing (or alternatively decrementing) value, even through a reset or reboot. Each read of the clock time thus provides, in addition to the current clock time (ExactTime), a unique monotonic value that can be used to order events, such as during forensic logging. The MonotonicTime can increment with uniform or non-uniform increments, but does not return the same count twice. The increments can be positive or negative as long as the MonotonicTime changes monotonically (progressively increases or progressively decreases).

The MonotonicTime is helpful since it is possible to have the clock object ExactTime set back in time. It may also be possible for subsequent reads of the clock time to return the same ExactTime value due to the speed at which successive reads can be made relative to the time value granularity. In these cases, it would otherwise be difficult to determine with authority the order of one event relative to another in time.

In an example embodiment of the present invention, in response to a read of the clock time from the clock object, the clock object returns to the requestor an indication of the kind of clock time being returned, the ExactTime, the LagTime, and the MonotonicTime.

2. Exemplary Embodiment

FIG. 1 is a block diagram of a multicomponent platform 100 having a host 102 coupled to a peripheral device 104 through a communications channel 106 according to an embodiment of the present invention. Various host software applications, such as APP1 (labeled 110) and APP2 (labeled 112) may interact with peripheral device 104 through a driver 114 and a peripheral interface 116.

Peripheral 104 includes a security provider (SP) 120, which includes an issued set of tables and methods that control a persistent trust state of the peripheral device. In one embodiment, security provider 120 is a completely self-contained and stand-alone security domain of such tables. A security provider includes objects that are each composed of persistent data and methods (or remote procedure calls). In one embodiment, security provider 120 includes a set of access control objects 122 and a clock object 124. Access to security provider 120 may be controlled, for example as described in U.S. Patent Application Publication US2003/0023867, published Jan. 30, 2003.

Applications on host 102 can query or change a persistent state on peripheral 104, such as the state of the clock time maintained by clock object 124, by establishing communication sessions with security provider 120. These sessions execute one or more object methods (connectors 130 in FIG. 1). Host 102 communicates with security provider 120 by opening a session using the interface commands of the particular interface 116. In a simple case, host 102 is the platform host to which the peripheral device is directly attached. In a more general case, host 102 could be some other platform host that communicates with an intermediate platform host, which relays the session stream to peripheral device 104 over a network. The communication sessions and the security and access control functions of security provider 120 are discussed in more detail in the U.S. patent applications cross-referenced above.

In one or more embodiments, the clock object 124 is embedded within the firmware of peripheral device 104, such as part of the firmware that implements the access control and secure/non-secure messaging system of security provider 120. Although the embodiment shown in FIG. 1 is described in the context of a security and access control function for peripheral device 104, clock object 124 can be utilized with any electronic device and as part of a security or access control function or not. Clock object 124 can be implemented as a separate function unrelated to any security, access control or messaging system in alternative embodiments of the present invention.

In an embodiment, clock object 124 includes a collection of persistent data and methods (such as remote procedural calls). The data can be maintained in one or more tables or other database formats. Methods are procedures, for example, that operate on tables or other objects. The caller (such as an application on host 102) passes a list of parameter values of the method to clock object 124, and the clock object returns a list of result values, followed by a status code, for example.

Clock object 124 includes a collection of clock information data and methods that operate on the data. The clock object can further include all or part of any hardware, software or firmware for implementing clock functions, storing the clock data and executing the methods, for example.

In the embodiment shown in FIG. 1, clock object 124 maintains a clock table 140 within a volatile memory 142 and a corresponding persistent clock table 144 in non-volatile memory 146. For example, if peripheral device comprises a data storage device, such as a disc drive, volatile memory 142 can include the random access memory (RAM) used by the drive processor 150, and non-volatile memory 146 can include the media of a data storage disc. However, any other type of volatile and non-volatile memory can be used in alternative embodiments.

As described in more detail below, clock tables 140 and 144 store clock information that can be changed or fetched (read) by applications on host 102. For example, application APP1 (labeled) 110 can set the LowTrust ExactTime or the HighTrust ExactTime by reading the time value from a local or remote low trust clock source 160 (such as a local PC clock) or from a local or remote high trust clock source 162. An example of a high trust clock source would be an SNTP clock source that is read by host 102 through a wired or wireless, local or wide area network, for example. The local low trust clock source 160 provides a quickly available, precise but not authoritative LowTrust ExactTime, while high trust clock source 162 provides a perhaps less precise, but authoritative HighTrust ExactTime. The high trust clock source 162 typically has a longer access time than the local low trust clock source 160.

When setting the LowTrust or HighTrust ExactTime value maintained by clock object 124, the host application APP1 starts a lag timer 170 and then reads the ExactTime value from clock source 160 or 162. The host application sends the read time value to clock object 124 as a parameter of a "ClockSet" method call, for example. Clock Object 124 receives the time value and responds to the host application APP1 that the clock time has been recorded in clock table 140. Once the host application APP1 receives confirmation that clock object 124 has received the ExactTime value, the host application reads the value, "LagTime", of lag timer 170. The LagTime value represents the maximum amount of time that the ExactTime recorded by clock object 124 is behind the actual time, which is the delay in successfully recording the ExactTime in the clock database. The LagTime value exceeds the worst-case lag error, but no further estimation needs to be done in one or more embodiments of the invention.

The host application sends the LagTime value to clock object 124 as a parameter of a further message. On receipt, clock object 124 permanently records the ExactTime and the LagTime, such as by sending the contents of volatile clock table 140 to non-volatile clock table 144. The LagTime value can be used to modify the ExactTime that is stored by clock object 124 or to provide a measure or boundary on the clock error.

The host application may choose to open a messaging session with clock object 124 either before or after it reads the time from clock source 160 or 162, depending on the implementation. If it is desired to obtain the closest time, the Host-side process will open a session with clock object 124 before reading and sending the source clock time. However, the time may have to come over a local, or wide area network, in which case there will be a larger lag time partly because the session may have to authenticate itself or secure the session with clock object 124 before the time is updated.

Once the static ExactTime value has been recorded, clock object 124 uses timer 180 to increment its measure of the current clock time, whether the recorded time is a LowTrust ExactTime and/or a HighTrustExactTime. Once peripheral device 104 is powered up, timer 180 can maintain an accurate and precise measure of time progression relative to the stored ExactTime values.

In addition, clock object 124 maintains the independent monotonic counter value, referred to as the MonotonicTime, in volatile clock table 140. Clock object 124 increments the MonotonicTime value each time a host application, or any other object or process reads the time from clock object 124. Periodically, clock object 124 stores the MonotonicTime value in non-volatile clock table 144 so as to always provide a monotonically increasing count, as discussed in more detail below.

If a real time clock 190 is available to peripheral device 104, clock object 124 can utilize its value as a low or high trust clock time value, as appropriate. Clock object 124 can also set the real time clock value through procedural calls made by a host application, for example.

The timers and other support functions for clock object 124 can be implemented in hardware, firmware, software or a combination in alternative embodiments.

3. Clock Tables

In an embodiment of the invention, a table generally includes a grid with named columns and addressable rows. At each column and row intersection there is a cell. All the cells in a column have the same type. However, the term "table" as used in the specification and claims can include any data structure or arrangement that can be used to associate two or more fields of data in memory. The "rows" and "columns" of the table refer to the manner in which the fields are associated with one another, not necessarily the physical arrangement of memory cells in which the fields are stored, and these two terms are interchangeable.

In one exemplary embodiment, clock tables 140 and 144 have a single row. Table 1 provides a description of the columns in clock tables 140 and 144, according to one embodiment of the present invention.

| Column | Type | Description |
| --- | --- | --- |
| HaveHigh | boolean | Indicates if high trust time values are valid. In particular, if this value is true, then the HighByWho, HighSetTime, HighInitialTimer and HighLag fields are meaningful. If TrustMode is Low then this value must be false. |
| HighByWho | uidref{Authority} | Authority that set the high trust time. |
| HighSetTime | clock_time | Valid only if HaveHigh is set to true. Otherwise it should be 0. |
| HighInitialTimer | clock_time | Valid only if HaveHigh is set to true. Otherwise it should be 0. |
| HighLag | clock_time | Valid only if HaveHigh is set to true. Otherwise it should be 0. |
| HaveLow | boolean | Indicates if low-order time values are valid. In particular, if this value is true, then the LowByWho, LowSetTime, LowInitialTimer and LowLag fields are meaningful. If TrustMode is High then this value must be false. |
| LowByWho | uidref{Authority} | Authority that set the low trust time. |
| LowSetTime | clock_time | Valid only if HaveLow is set to true. Otherwise it should be 0. |
| LowInitialTimer | clock_time | Valid only if HaveLow is set to true. Otherwise it should be 0. |
| LowLag | clock_time | Valid only if HaveLow is set to true. Otherwise it should be 0. |
| MonotonicBase | clock_time | The monotonic time counter value is periodically saved here. |
| Monotonic Reserve | clock_time | The MonotonicBase is saved every Reserve increments or when ResetClock is called. |
| TrustMode | clock_kind | Defines whether HaveHigh, HaveLow, or both may be true. |

In the above table, the data type "boolean" is a one byte unsigned integer, uinteger{1}, that can take on values 0 for "false" and 1 for "true", for example. Alternatively, a one-bit value could be used. The data type "uidref{Authority}" is a unique identifier that identifies a particular access-control authority, such as those maintained by the access control objects 122 in FIG. 1, through which the high trust time or the low trust time were set. The data type "clock_kind" has the format enum{Timer, Low, High, LowHigh}. One of these types would be enumerated in this column. The data type "clock_time" has the format typeOr{trusted: sntp_time, monotonic:uinteger{8}}. If the host has supplied a trusted time (LowTrust or HighTrust) since power up, then the "trusted" clock time is used, which has an sntp_time format. Otherwise the monotonic counter value is used, which is an unsigned eight-byte integer.

The HaveHigh field indicates if the high trust time values are valid. If this value is true, then the HighByWho, HighSetTime, HighInitialTimer and HighLag fields are meaningful. If TrustMode is Low then this value must be false, for example.

Similarly, the HaveLow field indicates if the trust time values are valid. If this value is true, then the LowByWho, LowSetTime, LowInitialTimer and LowLag fields are meaningful. If TrustMode is High then this value must be false, for example.

The HighSetTime and the LowSetTime correspond to the HighTrust ExactTime and the LowTrust ExactTime received from the host, which are static time values. The HighInitialTimer and the LowInitialTimer correspond to the respective values of "timer( )" from timer 180 at the moment when the values of HighSetTime and the LowSetTime are set. When either of these values are set by the host, the clock object records the static value of timer( ) in the respective field HighInitialTimer or LowInitialTimer.

The lag times measured by the host lag timer 170 for the high trust and low trust clock sources are stored in the HighLag and the LowLag columns, respectively. These lag times are generally representative of the delay between reading the ExactTimes from the clock sources and recording the corresponding set times in the clock table.

The value stored in the MonotonicBase column of the volatile clock table 140 (in RAM), which can be referred to as a volatile MonotonicBase, is incremented by a specified uniform or non-uniform increment each time an application, object or other process or device reads the time from clock object 124. On each read, the value of the volatile MonotonicBase is returned to the requestor as the MonotonicTime.

In one embodiment, the MonotonicBase has enough bits to ensure that the monotonic count will never reach a maximum count during the useful life of the electronic device in which it is used. For example, the MonotonicBase can have 64 bits. However a larger or smaller number of bits can be used in alternative embodiments.

The value of MonotonicReserve determines the period in number of increments of the volatile MonotonicBase at which the clock object 124 copies or saves its contents, and particularly the value of the volatile MonotonicBase, into the non-volatile clock table 144 in non-volatile memory 146. Thus, the non-volatile MonotonicBase value gets updated every MonotonicReserve increments of the volatile MonotonicBase. This keeps the count values incrementing while minimizing the number of writes to main memory. The clock object monitors the current sum of increments of the volatile MonotonicBase since the most recent save to the non-volatile memory, referred to as the MonotonicIncrement. When the MonotonicIncrement reaches the MonotonicReserve value, the clock object saves the volatile MonotonicBase to the non-volatile clock table.

On a reset or power-down, for example, the previous value of the volatile MonotonicBase is lost. However on power-up, the clock object loads the MonotonicBase column of the volatile clock table 140 with a value equal to at least the sum of the saved, non-volatile MonotonicBase and the Monotonic Reserve values. This ensures that the new value of the volatile MonotonicBase will be at least as great as the next most previous value that was saved prior to the reset. The volatile MonotonicBase value could not have incremented more than the MonotonicReserve since the last permanent save to the non-volatile clock table. Thus, the volatile MonotonicBase value is guaranteed always to increase, even though it may skip up by the MonotonicReserve value. Subsequent reads of the clock time from the clock object will never return the same MonotonicTime value.

The monotonic values can be handled in other ways in alternative embodiments. For example on each save to the non-volatile memory, the saved MonotonicBase can be increased in advance by the MonotonicReserve. After reset, the saved value can then be loaded directly into the volatile MonotonicBase. Other processes can also be used to ensure a monotonically increasing (or decreasing if desired) count.

Thus, the clock object maintains the following constraints:

$0 \leq MonotonicIncrement \leq MonotonicReserve$

Volatile MonotonicBase=Non-volatile MonotonicBase+MonotonicIncrement where MonotonicIncrement is the sum total of increments of MonotonicBase since the last save to non-volatile memory.

4. Clock Methods

This section provides example of methods or processes that can be called by a host application (or other process, object or device) and executed on or by the clock object. A method is an action that the host application desires to perform that makes use of a resource or feature of the peripheral device, such as the clock object.

4.1 GetClock Method

The GetClock method is used to fetch information about the current time and has the following format:

TableName.GetClock[ ]

=>

[Kind:clock_kind, ExactTime:clock_time, LagTime:clock_time, MonotonicTime:clock_time]

The first expression indicates the desired clock table name (the name of clock table 140 in FIG. 1) and specifies the GetClock method. The expression that follows the "=>" arrow represents the result returned to the host from the clock object.

The result has four parameters, "Kind" having the data type "clock_kind", "ExactTime" having the data type "clock_time", "LagTime" having the data type "clock_time", and "MonotonicTime" having the data type "clock_time". In an alternative embodiment, one or more of these parameters are returned in one or more separate messages.

Upon receiving a ClockGet Method call, the clock object reads its volatile clock table. If HaveLow is true, then the result will be [Low, LowTime, LowLag, MonotonicTime]. Else if HaveHigh is true, then the result will be [High, HighTime, HighLag, MonotonicBase]. Otherwise the result is ["timer",timer( ), 0, MonotonicBase]. Other priorities can be implemented in other embodiments.

In this embodiment, the GetClock method call returns either of the two virtual variables, HighTime or LowTime, depending on the contents of the clock table and the TrustMode. The clock object calculates these variables according to the following expressions:

HighTime=HighSetTime+(timer( )−HighInitialTime

LowTime=LowSetTime+(timer( )−LowInitialTime

The clock object reads the values of timer 180 and HighInitialTime to determine the time lapse from the HighSetTime (HighTrust ExactTime) initially set by the host and stored in the clock table. Alternatively, timer 180 can be reset each time the host sets the HighSetTime and then simply added to the HighSetTime when read again by the host. In a further alternative embodiment, separate timers can be provided for the high and low trust set times.

The clock_kind parameter thus serves as an indicator of a level of trust of the ExactTime clock time that is being returned. Alternatively, the clock object can return both the HighTime and the LowTime together with valid flags that indicate whether either of these clock times is valid. The valid flags also serve as indicators of the trust level of the clock source from which the clock times are based.

4.2 ResetClock Method

The ResetClock method has the following format:

TableName.ResetClock[ ]

=>

[Result:boolean]

This method resets the clock and puts the clock object into the timer mode. This method is called automatically when the peripheral device resets or when called by the host.

The clock object sets the following properties when this method is called:

TrustMode=Timer

HaveHigh=0 (i.e, false)

HaveLow=0 (i.e, false)

Volatile MonotonicBase=Non-volatile MonotonicBase+MonotonicReserve

In addition, the memory variable MonotonicIncrement is set to 0, which indicates the number of increments of the volatile MonotonicBase since the last save to the non-volatile MonotonicBase.

This guarantees that the volatile MonotonicBase always increases (although it may in a ResetClock method call skip up by MonotonicReserve value).

The boolean result returned by the clock object confirms whether the ResetClock method executed.

4.3 SetClockHigh Method

SetClockHigh method has the following format:

TableName.SetClockHigh[ExactTime:sntp_time, LagTime:sntp_time]

=>

[Result:Boolean]

This method is used by the host to set the time from a high trust source, such as source 162 in FIG. 1.

Figure 2:
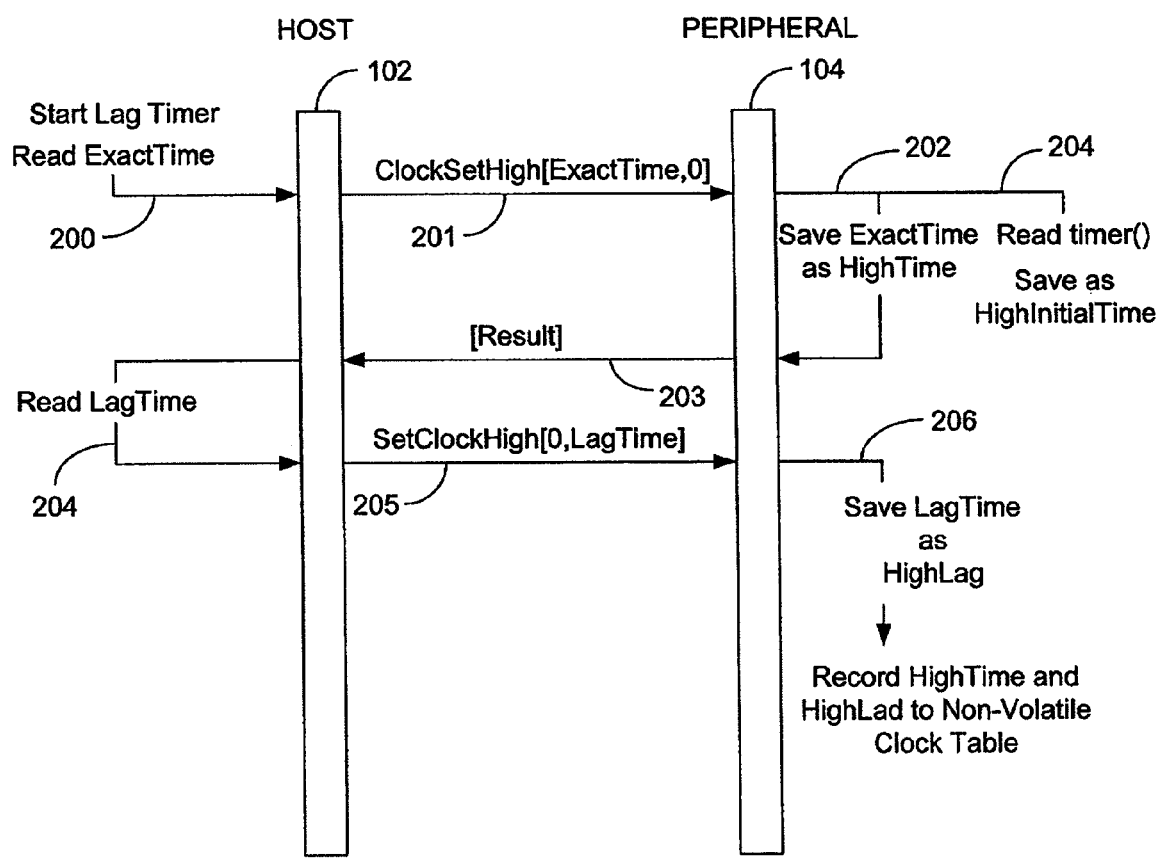
FIG. 2 is a diagram illustrating a message stream between a host and a peripheral device during a ClockSetHigh method.

FIG. 2 is a diagram illustrating an example message stream between the host and the peripheral during a ClockSetHigh method.

When setting the HighTrust ExactTime, the host application starts lag timer 170 (FIG. 1), at step 200 in FIG. 2, reads the ExactTime value from clock source 162 and then sends the ExactTime value to clock object 124 as a parameter in the above format, at step 201. At this point, the LagTime parameter is not included or set to a null value since the value remains unknown. Clock Object 124 receives the ExactTime value, stores the value in the HighTime column of the volatile clock table 140, at step 202, and confirms to the host application that the clock time has been recorded, at step 203. The Boolean 'Okay" result is set to true of the operation succeeded and false if the operation failed. The clock object also reads the value of timer 180 and records this value in the HighInitialTime column of the clock table, at step 204. Once the host application receives confirmation that clock object 124 has received the ExactTime value, the host application reads the value of lag timer 170, at step 204, and sends the LagTime value to clock object 124 as a parameter of a further SetClockHigh message, at step 205. On receipt, clock object 124 stores the LagTime in the HighLag column of the clock table and permanently records the HighTime and HighLag in the non-volatile clock table 144, at step 206.

This method call is accepted only when TrustMode is not Low. If this call is accepted, then HaveHigh is set to true and HighByWho is set to the authority for this messaging session. If the new high value does not bracket an existing low value according to the following constraints, then HaveLow is set to false.

When the TrustMode is LowHigh and both high and low values are present, then the low value must be contained within the high value. Specifically:

LowTime≧HighTime; and

LowTime+LowLag≦HighTime+HighLag.

The LowTime value should not be allowed to go back in time, so it must be greater than the HighTime. Also, since the LowLag should be shorter than the HighLag, then the second inequality should be true. Otherwise, there is a problem with the LowTime value.

When either inequality is not true, the clock object discards the LowTime because it is probably wrong, and resets the HaveLow value to "0" (false). Note that when implementing these time comparison steps, the value of timer( ) is not needed since it appears on both sides of the comparisons and cancels out.

4.4 SetClockLow Method

The SetClockLow method is similar to the SetClockHigh method and has the following format:

TableName.SetClockLow[ExactTime:sntp_time, LagTime:sntp_time]

=>

[Result:boolean]

This method is used to set the time from a low trust source, such as the PC clock 160 in FIG. 1.

This call is streamed in a similar fashion as that for the SetClockHigh method described above. The host sends the LowTrust ExactTime to the clock object while measuring the LowLag time with lag timer 170. The clock object records the LowTrust ExactTime in the LowTome column of the clock table, reads timer 180 and records its value in the LowInitialTime column of the clock table. Once the clock object confirms it has recorded the LowTime, the host sends the clock object the LowLag time value, which is stored in the LowLag column of the table. Both LowTime and LowLag are received before either is updated in the non-volatile memory.

This method call is accepted only when TrustMode is not High. If the mode is LowHigh and HaveHigh is true, then this call is accepted only when the existing high value brackets the new low value, according to the inequalities recited above. Other comparisons or constraints can be used in alternative embodiments.

If this call is accepted, then HaveLow is set to true and LowByWho is set to the authority for this session.

4.5 ClockSetMode Method

This method sets the TrustMode in the clock table and has the following format:

TableName.ClockSetMode[Mode:Clock_kind]

=>

[Result:boolean]

If the TrustMode is set to Low, then HaveHigh is set to false. If the TrustMode is set to High, then HaveLow is set to false. If the TrustMode is set to LowHigh, then HaveLow and HaveHigh are set to true.

4.6 RenewCounter Method

TableName.RenewCounter[]

=>

[Result:boolean]

The host calls this method any time it wants to synchronize the non-volatile clock table on the main storage media with the current values in the volatile clock table in RAM. The clock object writes the current values to the non-volatile memory and resets the MonotonicIncrement to zero. Note this method leaves the value of virtual variable MonotonicTime unchanged.

5. Conclusion

The clock object described above therefore is capable of providing electronic devices with at least some clock information that can be used to reliably order events monotonically without the need for constant power. Regardless of the granularity of the clock, the delay between subsequent clock reads, or power resets, the clock object provides unique, monotonically increasing information for each clock read. This is extremely helpful in data logging applications where it is important to accurately order events. For example the clock object can generate time stamps for forensic logging that prove a sequence of events that cannot be repudiated.

The clock object also provides an indication of whether the clock information is based on a high trusted source or a low trusted source and provides an indication of the clock error or other bounding conditions of the clock information.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the clock object while maintaining substantially the same functionality without departing from the scope and spirit of the present invention. In addition, although the preferred embodiment described herein is directed to a clock object for a peripheral, it will be appreciated by those skilled in the art that the teachings of the present invention can be applied to any electronic device, without departing from the scope and spirit of the present invention.

What is claimed is:

1. A clock object comprising:
   a clock time that is readable by an electronic device; and
   a monotonic time that is readable by the electronic device and is incremented for every read of the monotonic time from the clock object.

2. The clock object of claim 1 wherein in response to a clock read request from the electronic device, the clock object is adapted to return the clock time and the monotonic time in a single message to the electronic device.

3. The clock object of claim 1 wherein the monotonic time is independent of the clock time.

4. The clock object of claim 1 wherein the clock time and the monotonic time together form a hybrid time, and wherein the monotonic time increments in response to each read of the hybrid time from the clock object.

5. The clock object of claim 4 and further comprising:
   a volatile clock database, which is maintained within a volatile memory and stores the monotonic time as a volatile monotonic time; and
   a non-volatile clock database, which is maintained in a non-volatile memory, wherein the clock object is adapted to periodically store the volatile monotonic time to the non-volatile database as a non-volatile monotonic time.

6. The clock object of claim 5 and further comprising a reserve value and wherein:
   the clock object stores the volatile monotonic time to the non-volatile database every reserve value number of changes of the volatile monotonic time; and
   upon a reset of the clock object, the clock object is adapted to set the volatile monotonic time to at least a sum of the non-volatile monotonic time and the reserve value.

7. The clock object of claim 1 and further comprising:
   a clock database, which comprises:
     a static set time representative of a source time received from a clock source; and
     a timer, which increments a timer value, wherein the clock time is a function of the set time and the timer value.

8. The clock object of claim 1 and further comprising:
   a clock database, which comprises:
     a static set time representative of a source time read from a clock source, wherein the clock time is based on the source time; and
     a lag time representative of a delay in successfully recording the set time in the clock database.

9. The clock object of claim 8 wherein in response to a clock read request from the electronic device, the clock object is adapted to return the clock time and the lag time to the electronic device.

10. The clock object of claim 1 and further comprising an indication of a trust level of the clock time.

11. The clock object of claim 1 wherein:
    the clock time comprises at least one kind selected from the group comprising a high trust clock time, a low trust clock time and a timer value, wherein the high trust clock time is more authoritative than the low trust clock time; and
    in response to a clock read request from the electronic device, the clock object is adapted to return at least one of the high trust clock time, the low trust clock time and the timer value to the electronic device with an indication of the kind of clock time being returned.

12. The clock object of claim 11 and further comprising a clock database, which stores the high trust clock time and the low trust clock time, if available, and an indication of whether the database contains the high trust clock time and whether the database contains the low trust clock time.

13. A clock object comprising:
    a hybrid time that is readable by an electronic device, which comprises a clock time and monotonic time, wherein the monotonic time is incremented for every read of the hybrid time from the clock object; and
    a trust indicator indicative of a trust level of the clock time, wherein the clock object is adapted to return the clock time and the trust indicator to the electronic device in response to a clock read request from the electronic device.

14. The clock object of claim 13 wherein:
    the clock time comprises at least one kind of a high trust clock time and a low trust clock time, wherein the high trust clock time is more authoritative than the low trust clock time; and
    in response to the clock read request, the clock object is adapted to return at least one of the high trust clock time and the low trust clock time and the trust indicator to the electronic device.

15. The clock object of claim 14 wherein the trust indicator indicates the kind of clock time being returned.

16. The clock object of claim 14 and further comprising a clock database, which stores the high trust clock time and the low trust clock time, if available, and an indication of whether the database contains the high trust clock time and whether the database contains the low trust clock time.

17. The clock object of claim 13 and further comprising:
    a reserve value;
    a volatile clock database, which is maintained within a volatile memory and stores the monotonic time as a volatile monotonic time;
    a non-volatile clock database, which is maintained in a non-volatile memory, wherein the clock object is adapted store the volatile monotonic time to the non-volatile database as a non-volatile monotonic time, every reserve value number of changes of the volatile monotonic time; and
    upon a reset of the clock object, the clock object is adapted to set the volatile monotonic time to at least a sum of the non-volatile monotonic time and the reserve value.

18. The clock object of claim 13 and further comprising:
    a clock database, which comprises:
    a static set time representative of a source time received from a clock source; and
    a timer, which increments a timer value, wherein the clock time is a function of the set time and the timer value.

19. The clock object of claim 13 and further comprising:
    a clock database, which comprises:
      a static set time representative of a source time read from a clock source; and
      a lag time representative of a delay in successfully recording the set time in the clock database.

* * * * *